Patented Dec. 11, 1928.

1,694,497

UNITED STATES PATENT OFFICE.

RUDOLF ZELLMANN, OF RADEBEUL, AND DIETRICH LAMMERING, OF BRUNSWICK, GERMANY, ASSIGNORS TO CHEMISCHE FABRIK VON HEYDEN, OF RADEBEUL-DRESDEN, GERMANY, A CORPORATION OF GERMANY.

PLANT DISINFECTANT AND METHOD OF PRODUCING THE SAME.

No Drawing. Application filed December 26, 1925, Serial No. 77,845, and in Germany October 4, 1924.

We have found that for combating plant diseases caused by parasites, for instance such as fungi in the seed, finely distributed copper, preferably obtained by precipitating them on substances having a large surface, such as coal, charcoal, bolus, infusoria earth, silica-gel, talcum etc., which are inert to the plants and insoluble in water, are particularly suitable.

For instance bolus, coated with 2% copper, may be cited as a highly efficient medium for treating wheat against bunt; the growth of the smut spores is prevented by stopping the development of the germinated spores. The germination of the seed is not interfered with by copper in this form in contradistinction to the effect obtained by the wet treatment with copper sulphate.

The disinfectants obtained by our process may be applied as dusting powders or in the form of a suspension in water; they may also be mixed together or with other soluble or insoluble matter.

The effects obtained with our plant disinfectants, for instance metallic copper on bolus, are superior to those obtained by the application of copper carbonate because the copper is precipitated in a very finely divided form on an inert and cheap carrier, whereas with copper carbonate, acting also only with its surface on the parasites, one needs considerably greater quantities because the inside of the copper carbonate cannot become effective and therefore makes its application very expensive.

In the manufacture of our new disinfectants we proceed as follows:

We soak the carriers, for instance such as coal, charcoal, bolus, infusoria earth, silica-gel, talcum, and the like, with solutions of copper compounds, and then precipitate the copper on to them by any of the known methods. For instance when coating bolus with copper, we first soak bolus with a solution of copper sulphate and then act on the bolus thus treated with sodium hydrosulphide, whereupon we reduce the metal from the copper sulphide precipitated by the sodium hydrosulphide.

It has further been found by us that it is not necessary to start with special carriers as outlined above, as such carriers may advantageously be produced simultaneously with the copper. For instance a preparation, on which the copper is in the state of the finest distribution, is made in the following way:

To a solution of 120 g. copper sulphate and 270 g. ferrous sulphate in 3 liters of water, lime water is added until an alkaline reaction is obtained. The resulting ferrous hydroxide reduces the copper compound to metallic copper which is most finely distributed on the precipitated ferric hydroxide-gypsum mixture. This precipitate is separated from the waste liquor by filtering notwithstanding its enormous fineness, dried and powdered. The powder dusts and adheres well and is therefore excellently suitable for the dry disinfection of seed. By the addition of other suitably powdered substances the effect of the disinfectant powder can be graduated, or if desired, such inert matter, like bolus, can be added when the copper is precipitated thereby also accomplishing the desired graduation.

Instead of applying the disinfectant in dry powder form it can be applied also in the wet state and in this respect we have found it advantageous not to separate the precipitate from the waste liquor, but to use the same directly, eventually after proper dilution or after adding further substances of adhesive properties, by vigorously agitating the precipitate in the waste liquor and to sprinkle the emulsion thus obtained onto the plants.

What we claim is:

1. A plant disinfectant in the form of a pulverulent mass, comprising metallic copper in an extremely finely divided state.

2. A plant disinfectant in the form of a pulverulent mass comprising metallic copper in an extremely finely divided state and a finely divided inert carrier insoluble in water and to which the copper is adhering.

3. A plant disinfectant in the form of a pulverulent mass comprising metallic copper in an extremely finely divided state and bolus to which the copper is adhering.

4. The method of producing a plant disinfectant, comprising acting in the presence of a finely divided inert carrier, insoluble in water on the aqueous solution of a copper salt in the presence of ferrous sulphate with calcium hydroxide solution until an alkaline reaction is obtained, thereby precipitating calcium sulphate and the hydroxide of iron and of copper, the latter being reduced to its metallic state by the ferrous hydroxide, separating the precipitates from the waste liquor, and drying the precipitates.

In testimony whereof we affix our signatures.

Signed at Bremen, Germany, this 19th day of October, 1925.

RUDOLF ZELLMANN.
DIETRICH LAMMERING.